United States Patent
Asuke et al.

(10) Patent No.: US 8,368,364 B2
(45) Date of Patent: Feb. 5, 2013

(54) DC-DC CONVERTER WITH SNUBBER CIRCUIT

(75) Inventors: Hideki Asuke, Niiza (JP); Hideharu Takano, Niiza (JP); Mamoru Tsuruya, Niiza (JP); Masayoshi Yamamoto, Matsue (JP); Takahiro Kawashima, Matsue (JP); Shigeyuki Funabiki, Matsue (JP)

(73) Assignees: Sanken Electric Co., Ltd., Niiza-shi (JP); National University Corporation Shimane University, Matsue-shi (JP)

( * ) Notice: Subject to any disclaimer, the term of this patent is extended or adjusted under 35 U.S.C. 154(b) by 237 days.

(21) Appl. No.: 12/999,932

(22) PCT Filed: Jun. 15, 2009

(86) PCT No.: PCT/JP2009/060832
§ 371 (c)(1),
(2), (4) Date: Dec. 17, 2010

(87) PCT Pub. No.: WO2009/157329
PCT Pub. Date: Dec. 30, 2009

(65) Prior Publication Data
US 2011/0090716 A1    Apr. 21, 2011

(30) Foreign Application Priority Data
Jun. 23, 2008 (JP) .................. 2008-163252

(51) Int. Cl.
*G05F 1/613* (2006.01)
*G05F 1/24* (2006.01)
(52) U.S. Cl. ........ 323/232; 323/222; 323/223; 323/224; 323/229; 323/284; 323/290
(58) Field of Classification Search .......... 323/222–225, 323/229, 232, 233, 259, 261, 262, 282, 284, 323/290, 292, 293
See application file for complete search history.

(56) References Cited

U.S. PATENT DOCUMENTS 4,977,493 A   12/1990  Smith
5,636,114 A *  6/1997  Bhagwat et al. ........... 363/56.12
(Continued)

FOREIGN PATENT DOCUMENTS

EP   0 351 144    1/1990
JP   9 266665    10/1997
(Continued)

OTHER PUBLICATIONS

Horri, H., et al., "Implementation of Peak Current Mode Control Into Multiphase, Transformer-Linked, Step-Up Chopper Circuit," Joint Conference of the Chugoku Branch of Institutes for Electrical, Information and Communication Engineers, pp. 79-81, (2007), (with English translation).

(Continued)

*Primary Examiner* — Bao Q Vu
(74) *Attorney, Agent, or Firm* — Oblon, Spivak, McClelland, Maier & Neustadt, L.L.P.

(57) ABSTRACT

In order to achieve an object to reduce a surge voltage and suppress noise generation, the present invention provides a DC-DC converter with a snubber circuit, which boosts a voltage Vi of a DC power supply. The snubber circuit includes: a series circuit connected to both ends of a smoothing capacitor Co and including a snubber capacitor Cs and a snubber resistor Rs; a snubber diode Ds1 connected to a node at which the snubber capacitor Cs and the snubber resistor Rs are connected, and to a node at which a reactor Lr1 and an additional winding 1b of a transformer T1 are connected; and a snubber diode Ds2 connected to the node at which the snubber capacitor Cs and the snubber resistor Rs are connected, and to a node at which a reactor Lr2 and an additional winding 2b of a transformer T2 are connected.

2 Claims, 9 Drawing Sheets

U.S. PATENT DOCUMENTS

| | | | |
|---|---|---|---|
| 5,861,734 A * | 1/1999 | Fasullo et al. | 323/222 |
| 5,929,614 A * | 7/1999 | Copple | 323/222 |
| 6,084,790 A * | 7/2000 | Wong | 363/71 |
| 6,525,513 B1 * | 2/2003 | Zhao | 323/222 |
| 7,138,787 B2 * | 11/2006 | Tsuruya | 323/225 |
| 7,151,364 B2 * | 12/2006 | Kimura et al. | 323/282 |
| 7,183,753 B2 | 2/2007 | Tsuruya | |
| 7,233,507 B2 * | 6/2007 | Schenk | 363/50 |
| 7,276,884 B2 * | 10/2007 | Tsuruya | 323/261 |
| 7,486,055 B2 * | 2/2009 | Yamashita | 323/222 |
| 7,638,900 B2 | 12/2009 | Asuke et al. | |
| 2001/0024374 A1 | 9/2001 | Ben-Yaakov | |
| 2004/0113596 A1 * | 6/2004 | Peron | 323/282 |
| 2006/0208713 A1 | 9/2006 | Tsuruya | |
| 2008/0049475 A1 * | 2/2008 | Watanabe et al. | 363/127 |
| 2009/0262555 A1 | 10/2009 | Asuke et al. | |
| 2010/0019743 A1 | 1/2010 | Asuke et al. | |

FOREIGN PATENT DOCUMENTS

| | | |
|---|---|---|
| JP | 2002 520991 | 7/2002 |
| JP | 2006 262601 | 9/2006 |
| WO | 2004 095682 | 11/2004 |

OTHER PUBLICATIONS

International Search Report issued Sep. 8, 2009 in PCT/JP09/060832 filed Jun. 15, 2009.

U.S. Appl. No. 13/094,121, filed Apr. 26, 2011, Asuke, et al.

* cited by examiner

DC-DC CONVERTER WITH SNUBBER CIRCUIT

TECHNICAL FIELD

The present invention relates to a DC-DC converter with a snubber circuit, which is formed of a step-up chopper circuit, and particularly relates to a DC-DC converter with a snubber circuit, which is applicable to an electric vehicle.

BACKGROUND ART

FIG. 1 is a circuit configuration diagram of a conventional DC-DC converter described in Japanese Patent Application Publication No. 2006-262601. This step-up DC-DC converter includes a DC power supply Vdc1, transformers T3 and T4, a reactor L3, switches Q1 and Q2, diodes D3 and D4, a smoothing capacitor C1 and a control circuit 100.

The transformer T3 has a primary winding 5a (np turns), an additional winding 5b (np1 turns) connected to the primary winding 5a in series, and a secondary winding 5c (ns turns) electromagnetically coupled to the primary winding 5a and the additional winding 5b. The transformer T4 is configured in the same way as the transformer T3, hence having a primary winding 6a (np turns), an additional winding 6b (np1 turns) connected to the primary winding 6a in series, and a secondary winding 6c (ns turns) electromagnetically coupled to the primary winding 6a and the additional winding 6b.

The drain and source of the switch Q1 formed of a MOSFET or the like are connected to both ends of the DC power supply Vdc1 through the primary winding 5a of the transformer T3. The drain and source of the switch Q2 formed of a MOSFET or the like are connected to both ends of the DC power supply Vdc1 through the primary winding 6a of the transformer T4. A first series circuit, which includes the additional winding 5b of the transformer T3, the diode D3 and the smoothing capacitor C1, is connected to a node at which the primary winding 5a of the transformer T3 and the drain of the switch Q1 are connected, and to the source of the switch Q1. A second series circuit, which includes the additional winding 6b of the transformer T4, the diode D4 and the smoothing capacitor C1, is connected to a node at which the primary winding 6a of the transformer T4 and the drain of the switch Q2 are connected, and to the source of the switch Q2.

The reactor L3 is connected to both ends of a series circuit formed of the secondary winding 5c of the transformer T3 and the secondary winding 6c of the transformer T4. The control circuit 100 turns on and off the switches Q1 and Q2 based on an output voltage Vo of the smoothing capacitor C1 with a phase difference of 180°.

In the conventional DC-DC converter configured as above, the switch Q1 is turned on by a Q1 control signal Q1g from the control circuit 100. Then, an electric current flows through a path from the positive side of Vdc1 to the negative side of Vdc1 through 5a and Q1. Accordingly, an electric current Q1i in the switch Q1 linearly increases. At the same time, a voltage is generated also across the secondary winding 5c of the transformer T3, and an electric current L3i flows through the reactor L3 by flowing through a path from 5c to 5c through L3 and 6c.

This electric current L3i flows in accordance with the law of equal ampere-turns of transformers, causing energy to be stored in the reactor L3. At the same time, the same electric current flows through the secondary winding 6c of the transformer T4. Accordingly, across the primary winding 6a of the transformer T4 and across the additional winding 6b thereof, voltages corresponding to the respective numbers of turns are induced.

When an additional winding ratio of the transformer T4 is A=(np+np1)/np, an electric current, which is 1/A of the electric current Q1i in the switch Q1, flows through the diode D4 by flowing through a path from the positive side of Vdc1 to the negative side of Vdc1 through 6a, 6b, D4, and C1. The electric current D4i in the diode D4 flows until a time at which the switch Q2 is turned on. The output voltage Vo across the smoothing capacitor C1 is the sum of a voltage across the DC power supply Vdc1 (an input voltage), a voltage generated across the primary winding 6a of the transformer T4, and a voltage generated across the additional winding 6b of the transformer T4.

When a duty factor of the switch Q1 is D (D=Ton/T), the voltage generated across the transformer T4 is A·Vdc1·D, where Ton is a period of time during which the switch Q1 is on, and T is a cycle in which the switch Q1 is switched. The output voltage Vo across the smoothing capacitor C1 is Vo=Vdc1(1+A·D). Accordingly, the output voltage Vo can be controlled by changing the duty factor D.

Next, the switch Q1 is turned off by the Q1 control signal Q1g from the control circuit 100. Then, an electric current D3i flows through a path from the positive side of Vdc1 to the negative side of Vdc1 through 5a, 5b, D3, and C1.

Next, the switch Q2 is turned on by the Q2 control signal Q2g from the control circuit 100. Then, an electric current D3i flows through a path from the positive side of Vdc1 to the negative side of Vdc1 through 6a and Q2. Accordingly, an electric current Q2i in the switch Q2 linearly increases. At the same time, a voltage is generated also across the secondary winding 6c of the transformer T4, and the electric current L3i flows through the reactor L3 by flowing through a path from 6c to 6c through 5c and L3 while increasing.

This electric current L3i flows in accordance with the law of equal ampere-turns of transformers, causing energy to be stored in the reactor L3. At the same time, the same electric current flows through the secondary winding 5c of the transformer T3. Accordingly, across the primary winding 5a of the transformer T3 and across the additional winding 5b thereof, voltages corresponding to the respective numbers of turns are induced.

When an additional winding ratio of the transformer T3 is A=(np+np1)/np, an electric current, which is 1/A of the electric current Q2i in the switch Q2, flows through the diode D3 by flowing through a path from the positive side of Vdc1 to the negative side of Vdc1 through 5a, 5b, D3, and C1. The electric current D3i in the diode D3 flows until a time at which the switch Q1 is turned on. The output voltage Vo across the smoothing capacitor C1 is the sum of a voltage across the DC power supply Vdc1 (an input voltage), a voltage generated across the primary winding 5a of the transformer T3, and a voltage generated across the additional winding 5b of the transformer T3.

As described above, in the multiphase, transformer-linked, step-up chopper circuit shown in FIG. 1, two phases, which are independent of each other, are coupled by transformers. This allows boosting operation using only one core, instead of two or more cores needed without the coupling.

SUMMARY OF THE INVENTION

Problems to be Solved by the Invention

However, in the case of the DC-DC converter shown in FIG. 1, recovery losses of the diodes D3 and D4 occur. In addition, switching losses occur when the switches Q1 and Q2 are turned on.

To solve this, a reactor La (unillustrated) is connected between the primary winding 5a and the additional winding 5b, and a reactor Lb (unillustrated) is connected between the primary winding 6a and the additional winding 6b. In this way, recovery losses of the diodes D3 and D4 can be suppressed.

However, even though recovery losses of the diodes D3 and D4 can be suppressed, resonance occurs between the reactors La and Lb added to suppress the recovery losses, and the capacitances of the depletion layers of the diodes D3 and D4 turned off to be in a reverse-blocking state. This resonance causes a surge voltage and ringing. Accordingly, elements such as the switches may be broken and noises may be generated.

An object of the present invention is to provide a DC-DC converter with a snubber circuit, which is capable of suppressing a recovery loss of a diode and a switching loss at the time of turning on a switch. Moreover, the present invention provides a DC-DC converter with a snubber circuit, which is capable of reducing a surge voltage and suppressing noise generation to thereby prevent an element such as the switch from being broken.

Means for Solving the Problems

To solve the above problems, a first invention is a DC-DC converter with a snubber circuit, which boosts a voltage of a DC power supply, including: a first switch connected to both ends of the DC power supply through a primary winding of a first transformer; a second switch connected to both ends of the DC power supply through a primary winding of a second transformer; a first series circuit connected to both ends of the first switch and including a first reactor, an additional winding of the first transformer, a first diode, and a smoothing capacitor; a second diode connected to one end of the first switch and one end of the smoothing capacitor; a second series circuit connected to both ends of the second switch and including a second reactor, an additional winding of the second transformer, a third diode, and the smoothing capacitor; a fourth diode connected to one end of the second switch and the one end of the smoothing capacitor; a third reactor connected to both ends of a series circuit in which a secondary winding of the first transformer and a secondary winding of the second transformer are connected in series; a third series circuit connected to both ends of the smoothing capacitor and including a snubber capacitor and a snubber resistor; a first snubber diode connected to a node at which the snubber capacitor and the snubber resistor are connected, and to a node at which the first reactor and the additional winding of the first transformer are connected; a second snubber diode connected to the node at which the snubber capacitor and the snubber resistor are connected, and to a node at which the second reactor and the additional winding of the second transformer are connected; and a control circuit turning on the first switch and the second switch alternately in every ½ cycle, turning off the first switch during an on period of the second switch and turning off the second switch during an on period of the first switch.

A second invention is a DC-DC converter with a snubber circuit, which boosts a voltage of a DC power supply, including: a first switch connected to both ends of the DC power supply through a primary winding of a first transformer and a first reactor; a second switch connected to both ends of the DC power supply through a primary winding of a second transformer and a second reactor; a first series circuit connected to both ends of a series circuit which includes the first reactor and the first switch, and including an additional winding of the first transformer which is connected to the primary winding of the first transformer in series, a first diode and a smoothing capacitor; a second diode connected to a node at which the first reactor and the first switch are connected, and to one end of the smoothing capacitor; a second series circuit connected to both ends of a series circuit which includes the second reactor and the second switch, and including an additional winding of the second transformer which is connected to the primary winding of the second transformer in series, a third diode and the smoothing capacitor; a fourth diode connected to a node at which the second reactor and the second switch are connected, and to the one end of the smoothing capacitor; a third reactor connected to both ends of a series circuit in which a secondary winding of the first transformer and a secondary winding of the second transformer are connected in series; a third series circuit connected to both ends of the smoothing capacitor and including a snubber capacitor and a snubber resistor; a first snubber diode connected to a node at which the snubber capacitor and the snubber resistor are connected, and to a node at which the primary winding and the additional winding of the first transformer are connected; a second snubber diode connected to the node at which the snubber capacitor and the snubber resistor are connected, and to a node at which the primary winding and the additional winding of the second transformer are connected; and a control circuit turning on the first switch and the second switch alternately in every ½ cycle, and turning off the first switch during an on period of the second switch and turning off the second switch during an on period of the first switch.

Effects of the Invention

According to the present invention, the first reactor and the second reactor are provided. Thus, it is possible to suppress recovery losses of the first, second, third and fourth diodes as well as switching losses at the time of turning on the first and second switches. In addition, there is provided a snubber circuit including the snubber capacitor, the snubber resistor, the first snubber diode and the second snubber diode. Thus, it is possible to reduce a surge voltage and suppress noise generation to thereby prevent elements such as the switches from being broken. Moreover, the voltage across the snubber capacitor is clamped at an output voltage. Thus, no further discharge is performed. Accordingly, there is no power loss, which would otherwise occur along with unnecessary charge and discharge of the snubber capacitor. The power loss occurring in this clamp-type snubber circuit is not associated with the snubber capacitor. Moreover, there is no time required for charge and discharge. Hence, high-speed operation is possible.

MODES FOR CARRYING OUT THE INVENTION

Figure 1:
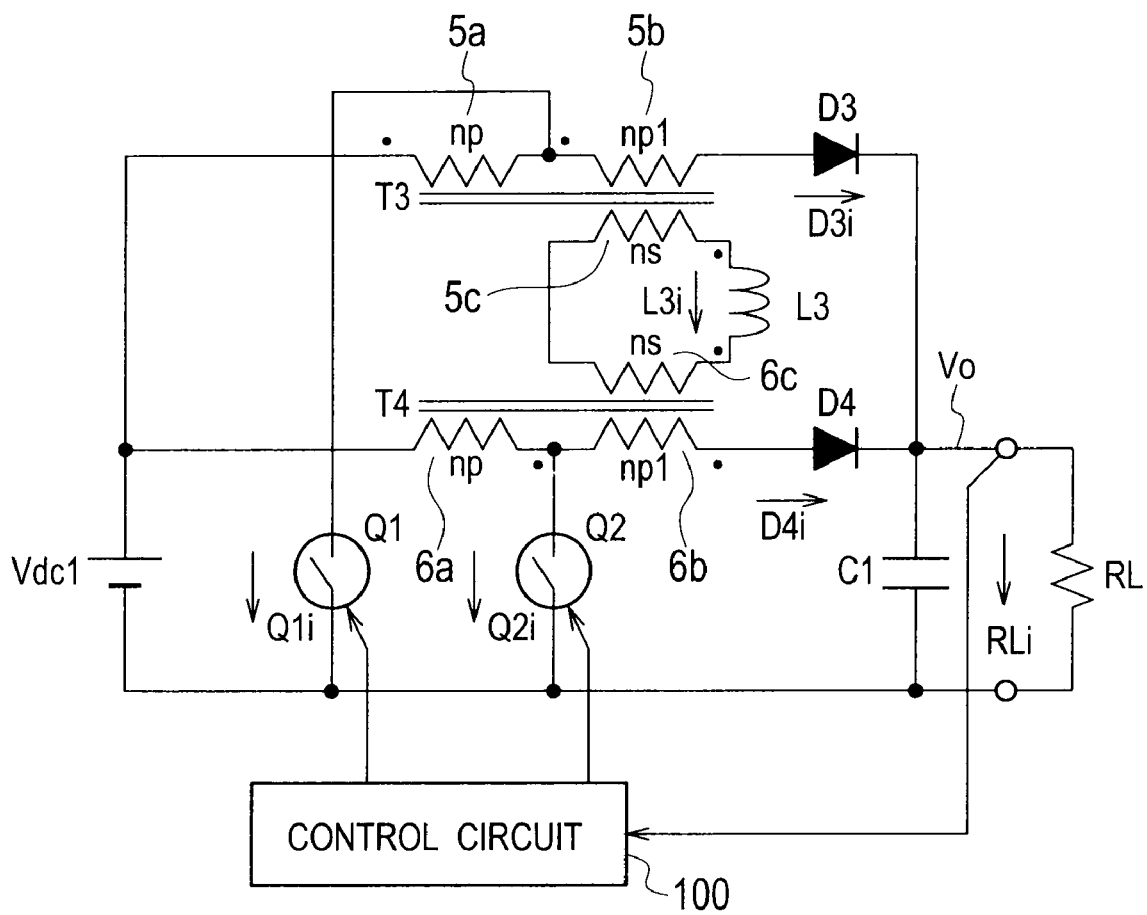
FIG. 1 is a circuit configuration diagram of a conventional DC-DC converter.

Hereinbelow, embodiments of a DC-DC converter with a snubber circuit of the present invention will be described in detail by referring to the drawings.

EXAMPLE 1

Figure 2:
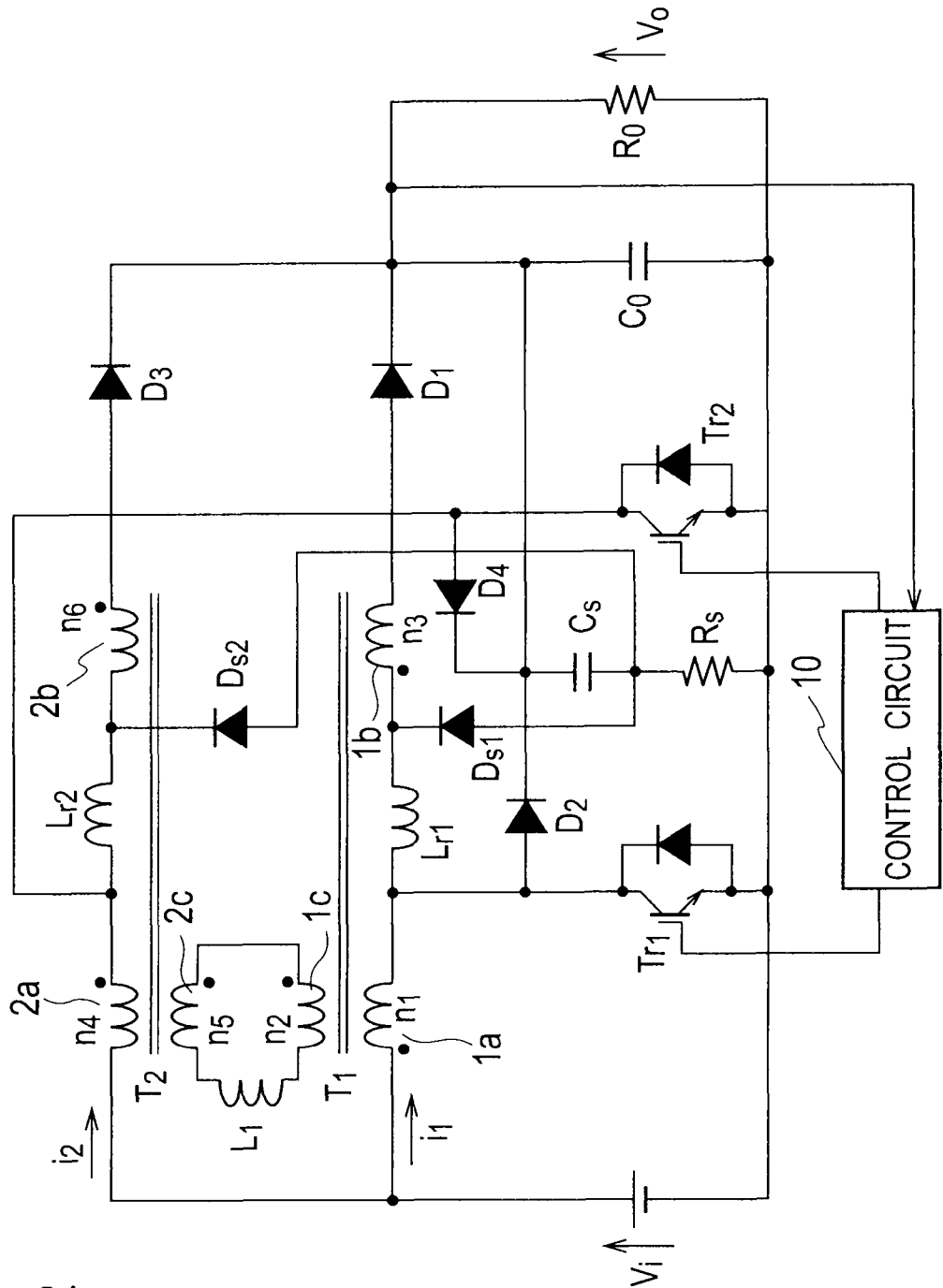
FIG. 2 is a circuit configuration diagram showing a DC-DC converter with a snubber circuit of Example 1.

FIG. 2 is a circuit configuration diagram showing a DC-DC converter with a snubber circuit of Example 1. The DC-DC converter with the snubber circuit shown in FIG. 2 is formed of a multiphase, transformer-linked, step-up chopper circuit.

The DC-DC converter with the snubber circuit includes a DC power supply Vi, a transformer T1 (first transformer), a transformer T2 (second transformer), a reactor Lr1 (first reactor), a reactor Lr2 (second reactor), a reactor L1 (third reactor), a switch Tr1 (first switch), a switch Tr2 (second switch), diodes D1, D2, D3 and D4, a snubber diode Ds1 (first snubber diode), a snubber diode Ds2 (second snubber diode), a snubber resistor Rs, a snubber capacitor Cs, a smoothing capacitor Co and a control circuit 10.

The transformer T1 has a primary winding 1a (n1 turns), an additional winding 1b (n3 turns), and a secondary winding 1c (n2 turns) electromagnetically coupled to the primary winding 1a. The transformer T2 is configured in the same way as the transformer T1, hence having a primary winding 2a (n4 turns), an additional winding 2b (n6 turns), and a secondary winding 2c (n5 turns) electromagnetically coupled to the primary winding 2a.

The primary winding 1a of the transformer T1 and the collector and emitter of the switch Tr1 formed of an IGBT (insulated gate bipolar transistor) are connected to both ends of the DC power supply Vi. The primary winding 2a of the transformer T2 and the collector and emitter of the switch Tr2 formed of an IGBT are connected to both ends of the DC power supply Vi.

A first series circuit, which includes the reactor Lr1, the additional winding 1b of the transformer T1, the diode D1 and the smoothing capacitor Co, is connected to both ends of the switch Tr1. A second series circuit, which includes the reactor Lr2, the additional winding 2b of the transformer T2, the diode D3 and the smoothing capacitor Co, is connected to both ends of the switch Tr2.

The diode D2 is connected between one end (collector) of the switch Tr1 and one end (positive terminal) of the smoothing capacitor Co. The diode D4 is connected between one end (collector) of the switch Tr2 and the one end (positive terminal) of the smoothing capacitor Co. The reactor L1 is connected to both ends of a series circuit in which the secondary winding 1c of the transformer T1 and the secondary winding 2c of the transformer T2 are connected in series.

A third series circuit, which includes the snubber capacitor Cs and the snubber resistor Rs, is connected to both ends of the smoothing capacitor Co. The snubber diode Ds1 is connected to a node at which the snubber capacitor Cs and the snubber resistor Rs are connected, and to a node at which the reactor Lr1 and the additional winding 1b of the transformer T1 are connected. The snubber diode Ds2 is connected to the node at which the snubber capacitor Cs and the snubber resistor Rs are connected, and to a node at which the reactor Lr2 and the additional winding 2b of the transformer T2 are connected.

The snubber capacitor Cs, the snubber resistor Rs and the snubber diodes Ds1 and Ds2 constitute a snubber circuit.

Based on an output voltage Vo across the smoothing capacitor Co, the control circuit 10 performs control in such a way that it turns on the switch Tr2 after the switch Tr1 is turned on but before the switch Tr1 is turned off, and that it turns on the switch Tr1 before the switch Tr2 is turned off. That is, in every ½ cycle, there is an overlapping period in which the switch Tr1 and the switch Tr2 are both on.

The transformer T1, the reactor Lr1, the diode D1, the diode D2 and the switch Tr1 constitute a first converter. The transformer T2, the reactor Lr2, the diode D3, the diode D4 and the switch Tr2 constitute a second converter.

According to the DC-DC converter with the snubber circuit configured as described above, the reactor Lr1 is connected to the primary winding 1a and the additional winding 1b of the transformer T1, and the reactor Lr2 is connected to the primary winding 2a and the additional winding 2a of the transformer T2. Accordingly, recovery losses of the diodes D1 to D4 as well as switching losses at the time of turning on the switches Tr1 and Tr2 can be suppressed.

In the following, described is the operation of the snubber circuit, which is a feature of the DC-DC converter with the snubber circuit of Example 1. The snubber circuit operates to demonstrate its surge-voltage suppressing effect mainly when the diode D1 is turned off (same applies to the diode D3), and also when the switch Tr1 is turned off (same applied to the switch Tr2). Thus, by referring to the drawings, description will be given of the operation at the time of turning off the diode D1 and the operation at the time of turning off the switch Tr1.

Figure 5:
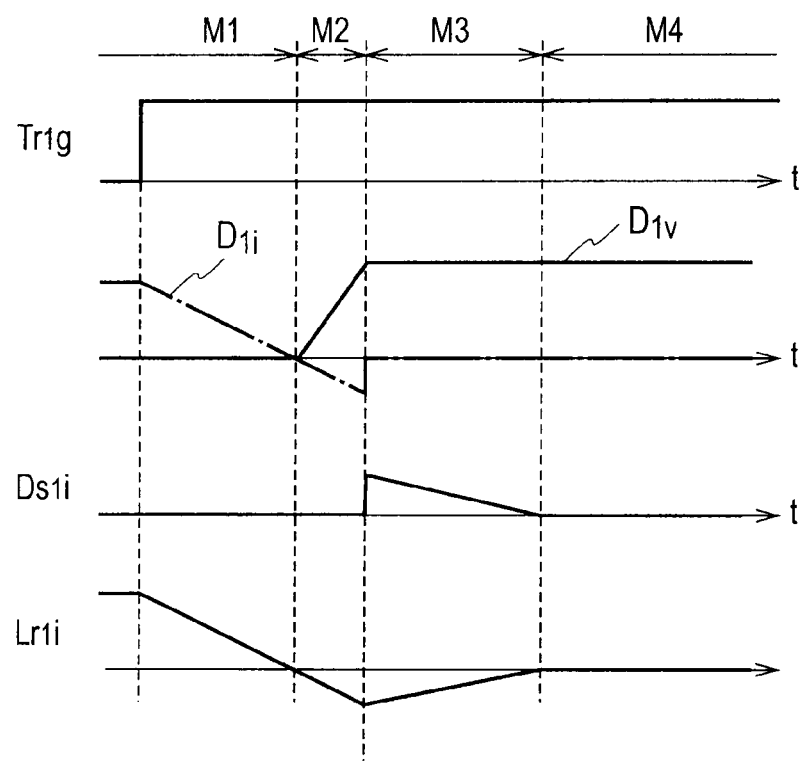
FIG. 5 is a timing chart at the time of turning off the diode D1, in a case with the snubber circuit.

First, the operation at the time of turning off the diode D1 will be described using FIGS. 3 and 5. Note that the operation at the time of turning off the diode D3 is the same as the operation at the time of turning off the diode D1.

Figure 3:
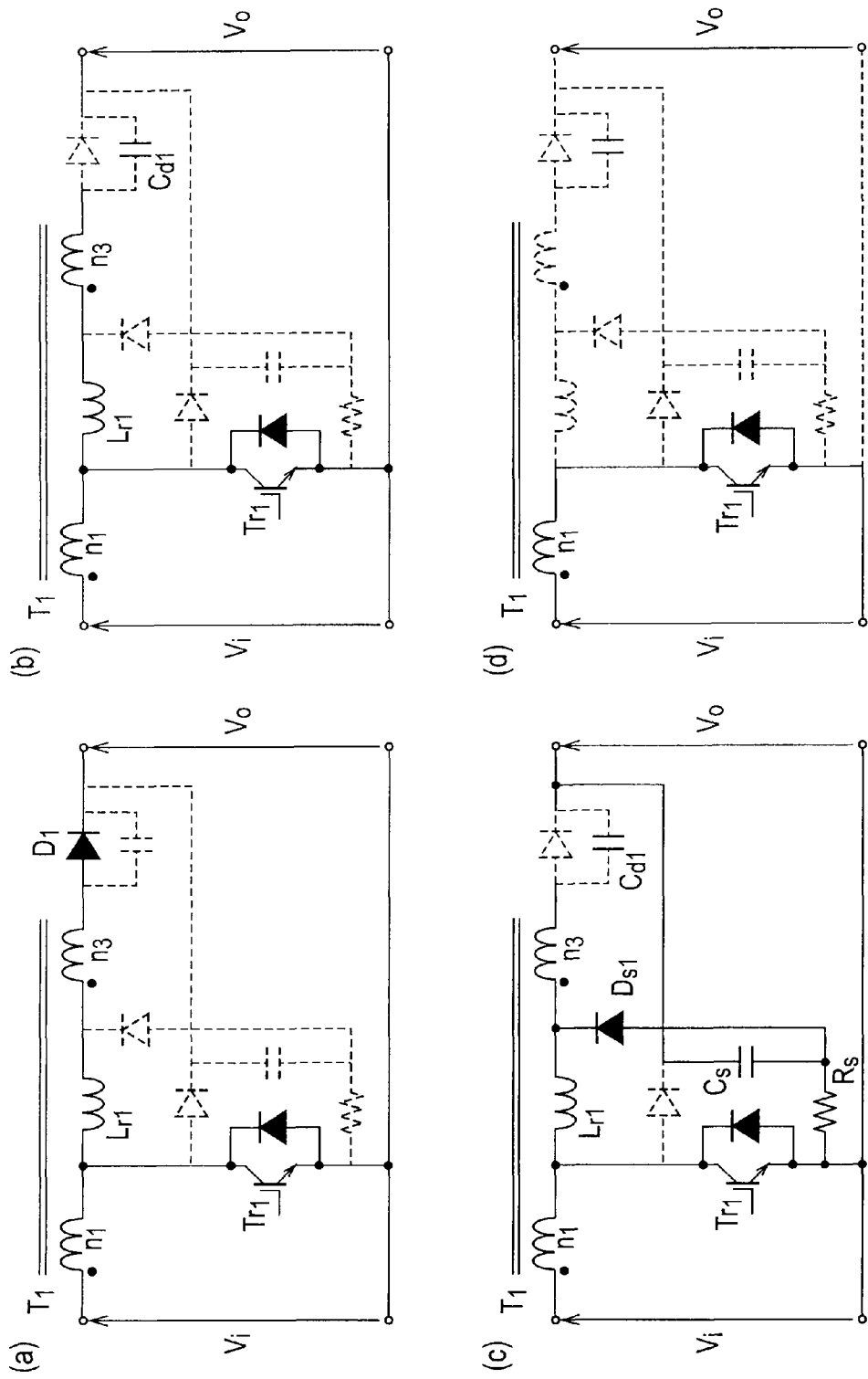
FIGS. 3(a) to 3(d) are diagrams showing operation at the time of turning off a diode D1 of the DC-DC converter with the snubber circuit of Example 1.

In FIG. 3, the diode D1 having been turned off to be in a reverse-blocking state is illustrated equivalently as a depletion-layer capacitor Cd1. In a mode M1 shown in FIG. 3(a), when the switch Tr1 is turned on, an electric current D1i in the diode D1 and an electric current Lr1i in the reactor Lr1 decrease. In a mode M2 shown in FIG. 3(b), the diode D1 is turned off, and a voltage D1v across the diode D1 rises.

Next, in a mode M3 shown in FIG. 3(c), the snubber capacitor Cs having the snubber resistor Rs connected thereto in series is connected to an output voltage Vo in parallel. The snubber capacitor Cs is charged up to the output voltage Vo and is clamped at that voltage. Thus, no further discharge is performed. Accordingly, there is no power loss, which would otherwise occur along with unnecessary charge and discharge of the snubber capacitor Cs. The power loss occurring in this clamp-type snubber circuit is not associated with the snubber capacitor Cs. Moreover, there is no time required for charge and discharge. Hence, high-speed operation is possible.

Then, when the voltage Vd1 across the capacitor Cd1 with the diode D1 turned off reaches or exceeds a voltage obtained by adding the output voltage Vo and the voltage across the additional winding 1b (n3) because of the resonance between the reactor Lr1 and the capacitor Cd1, the potential of the cathode of the snubber diode Ds1 becomes lower than that of the ground. This turns on the snubber diode Ds1 and causes an electric current Ds1i to flow through the snubber diode Ds1. A resonant electric current flows and is charged into the snubber capacitor Cs, and a surge voltage is absorbed by the snubber circuit. The energy of the surge voltage absorbed by the snubber circuit is released to the ground side through the snubber resistor Rs. For this reason, resonance with a parasitic inductance of the wire at the time of the discharge of the snubber capacitor Cs is attenuated by the snubber resistor Rs, so that no noise is generated. Then, as the electric current Ds1i in the snubber diode Ds1 becomes zero, the mode changes to a mode M4 shown in FIG. 3(d) whereby only the switch Tr1 is on.

Figure 4:
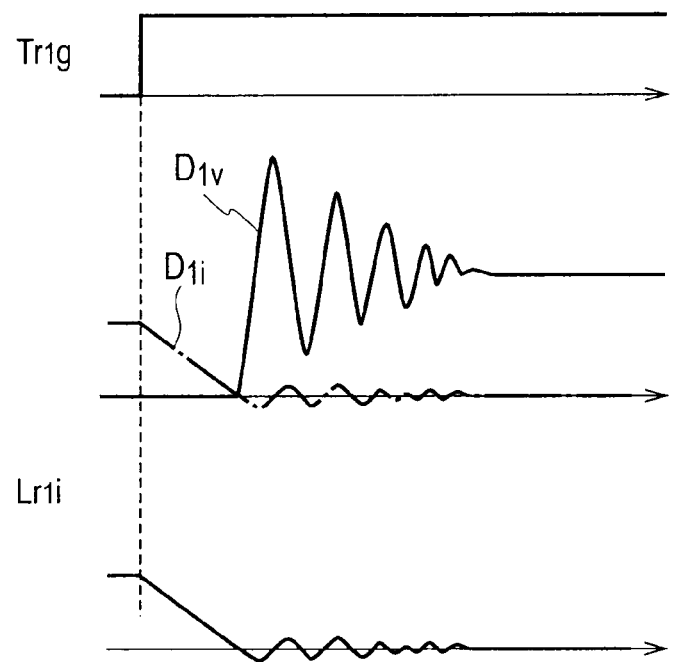
FIG. 4 is a timing chart at the time of turning off the diode D1, in a case without the snubber circuit.

FIG. 4 shows a timing chart at the time of turning off the diode D1, in a case without the snubber circuit. As compared to the case without the snubber circuit in FIG. 4, a case with the snubber circuit in FIG. 5 shows significant suppression of the surge voltage generated across the diode D1.

Figure 6:
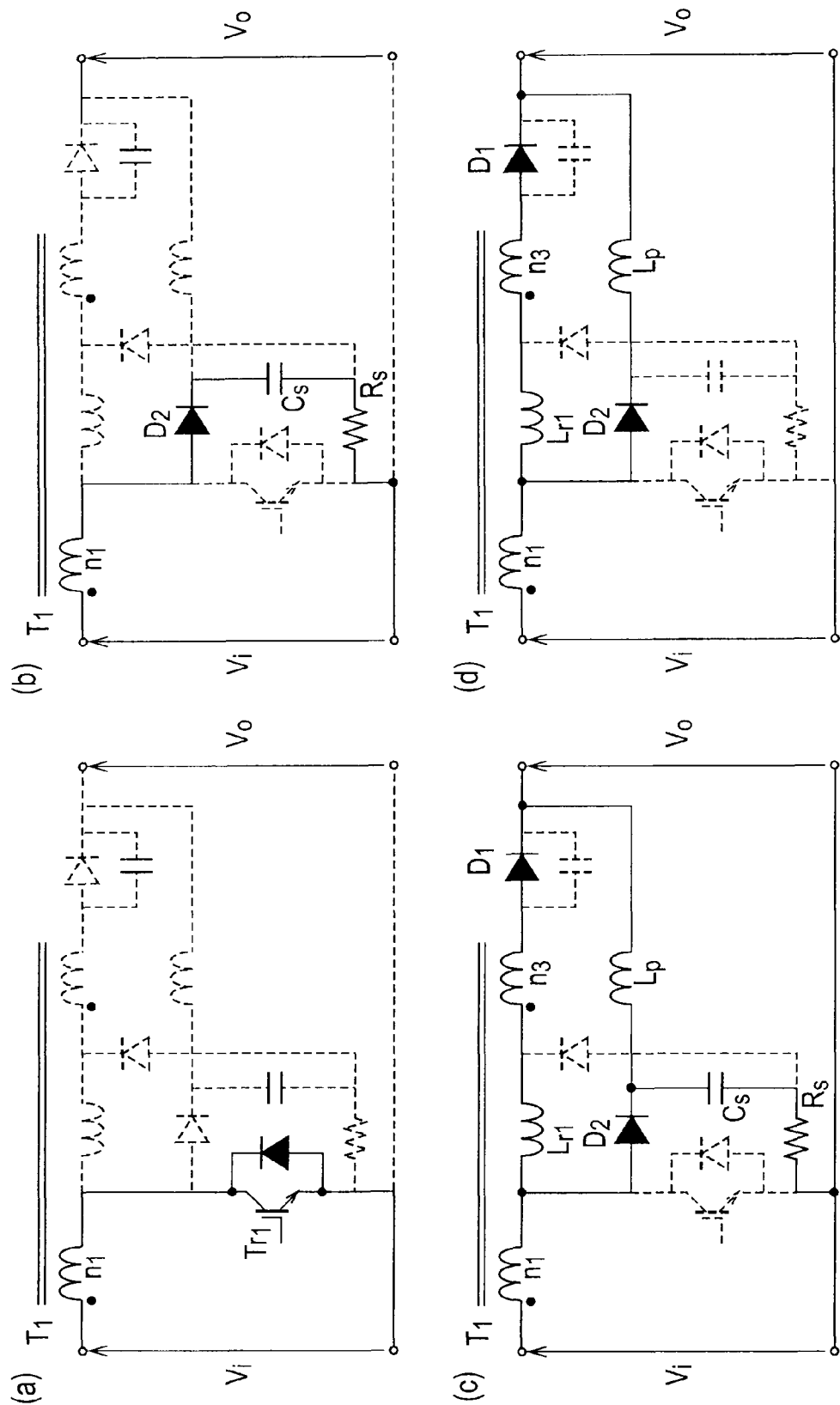
FIGS. 6(a) to 6(d) are diagrams showing operation at the time of turning off a switch Tr1 of the DC-DC converter with the snubber circuit of Example 1.
Figure 8:
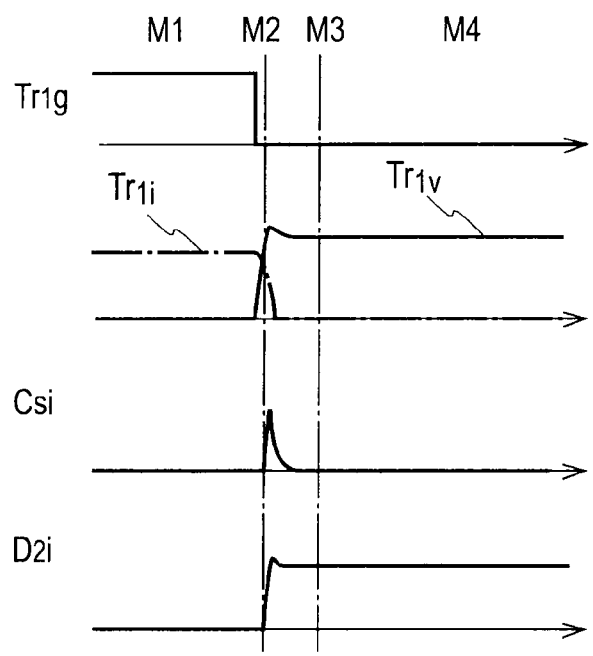
FIG. 8 is a timing chart at the time of turning off the switch Tr1, in a case with the snubber circuit.

Next, by using FIGS. 6 and 8, description will be given of an effect on the surge voltage which is generated across the switch Tr1 due to the resonance between a parasitic inductance Lp of the wire generated when the switch Tr1 is turned off, and the parasitic capacitance (unillustrated) of the switch Tr1.

Note that the operation at the time of turning off the switch Tr2 is the same as the operation at the time of turning off the switch Tr1.

First, in a mode M1 shown in FIG. 6(a), the switch Tr1 is turned on, and an electric current Tr1i flows through the switch Tr1. Next, in a mode M2 shown in FIG. 6(b), the switch Tr1 is turned off, and a voltage Tr1v across the switch Tr1 rises. Then, electric currents D2i and Csi flow through a path from Vi to Vi through 1a (n1), D2, Cs, and Rs. That is, the electric currents D2i and Csi flow into the snubber circuit, and a surge voltage is thus absorbed by the snubber circuit.

Next, in a mode M3 shown in FIG. 6(c), electric currents flow through a path from Vi to Vi through 1a (n1), D2, Cs, and Rs, a path from Vi to Vi through 1a (n1), D2, Lp, and Vo, and a path from Vi to Vi through 1a (n1), Lr1, 1b (n3), D1, and Vo.

In this case too, the energy of the surge voltage absorbed by the snubber circuit is released to the ground side through the snubber resistor Rs. For this reason, resonance with the parasitic inductance Lp of the wire at the time of discharge of the snubber capacitor Cs is attenuated by the snubber resistor Rs, so that no noise is generated.

Figure 7:
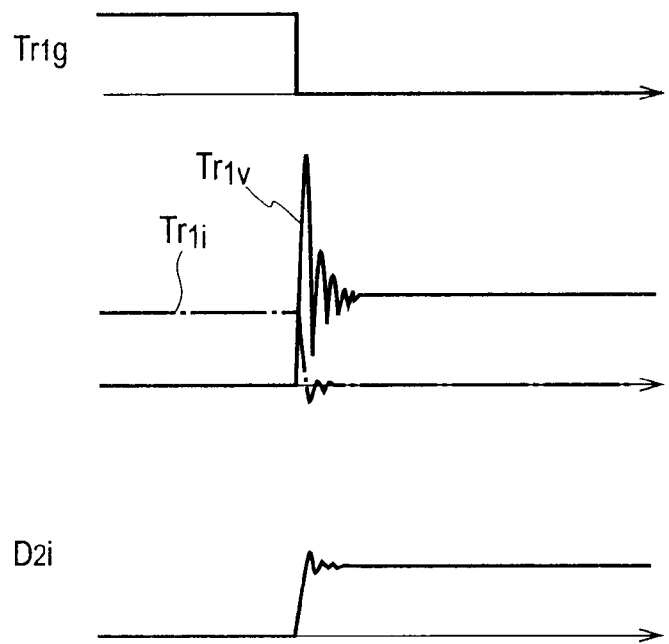
FIG. 7 is a timing chart at the time of turning off the switch Tr1, in a case without the snubber circuit.

FIG. 7 shows a timing chart at the time of turning off the switch Tr1 in a case without the snubber circuit. As compared to the case without the snubber circuit in FIG. 7, a case with the snubber circuit in FIG. 8 shows significant suppression of the surge voltage generated when the switch Tr1 is turned off.

Figure 9:
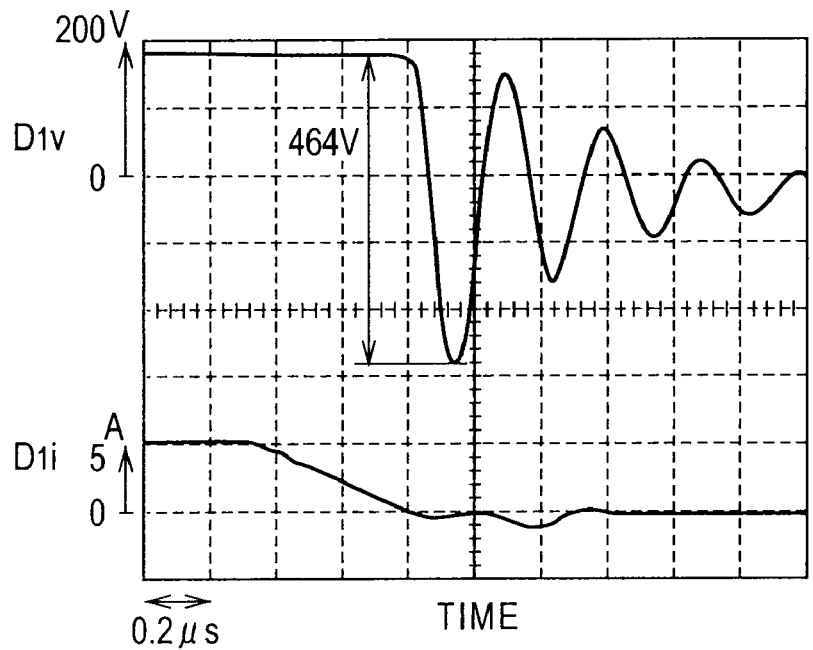
FIG. 9 is a diagram showing the waveforms of the voltage across and the electric current in the diode D1 in a case without the snubber circuit.
Figure 10:
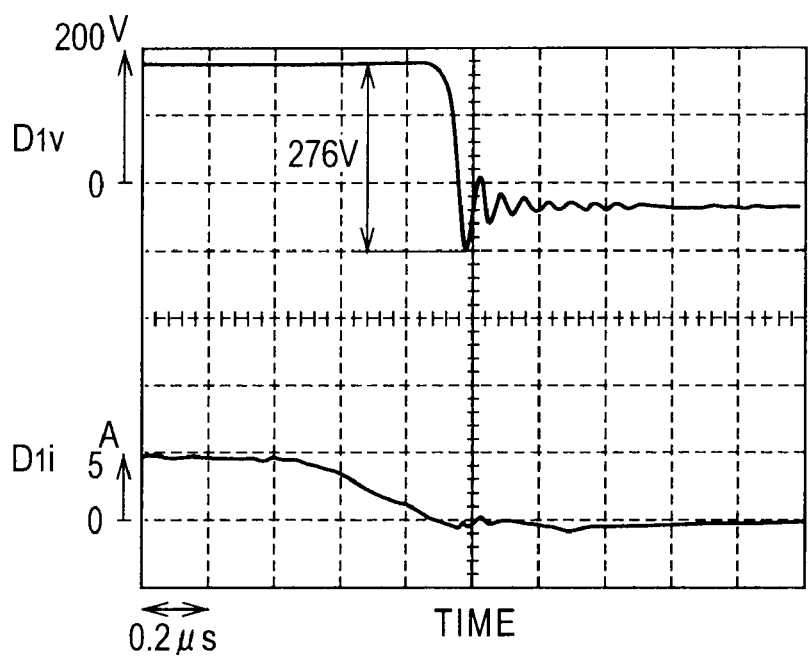
FIG. 10 is a diagram showing the waveforms of the voltage across and the electric current in the diode D1 in a case with the snubber circuit.
Figure 11:
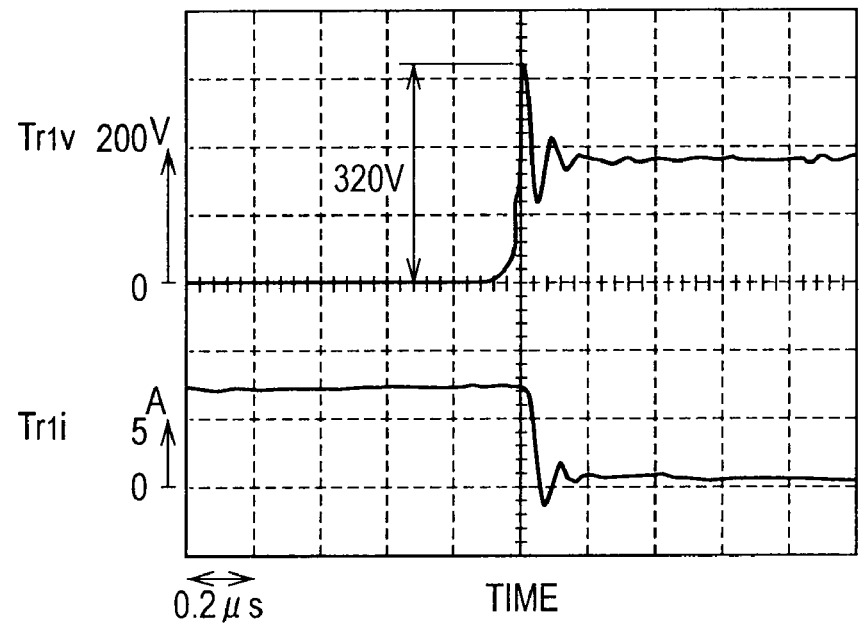
FIG. 11 is a diagram showing the waveforms of the voltage across and the electric current in the switch Tr1 in a case without the snubber circuit.
Figure 12:
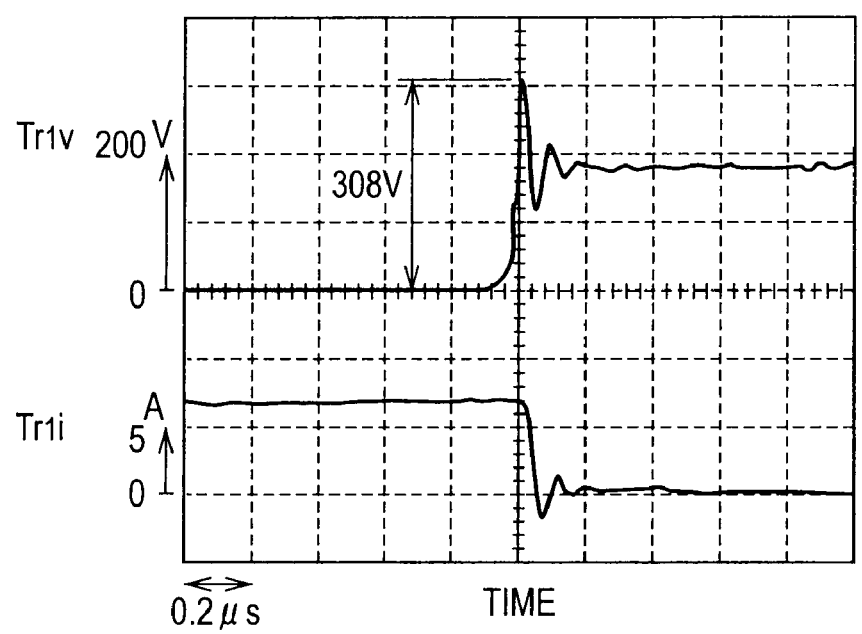
FIG. 12 is a diagram showing the waveforms of the voltage across and the electric current in the switch Tr1 in a case with the snubber circuit.

FIG. 9 shows the waveforms of the voltage across and the electric current in the diode D1 in the case without the snubber circuit. FIG. 10 shows the waveforms of the voltage across and the electric current in the diode D1 in the case with the snubber circuit. FIG. 11 shows the waveforms of the voltage across and the electric current in the switch Tr1 in the case without the snubber circuit. FIG. 12 shows the waveforms of the voltage across and the electric current in the switch Tr1 in the case with the snubber circuit. FIGS. 9 to 12 show the results obtained by operating the respective circuits in experiments.

A comparison between FIGS. 9 and 10 shows that the peak voltage, which is 464 V in the case without the snubber circuit, is suppressed down to 276 V by providing the snubber circuit, meaning that the peak voltage across the diode D1i is reduced by 88 V. A comparison between FIGS. 11 and 12 shows that the peak voltage, which is 320 V in the case without the snubber circuit, is suppressed down to 308 V by providing the snubber circuit.

EXAMPLE 2

Figure 13:
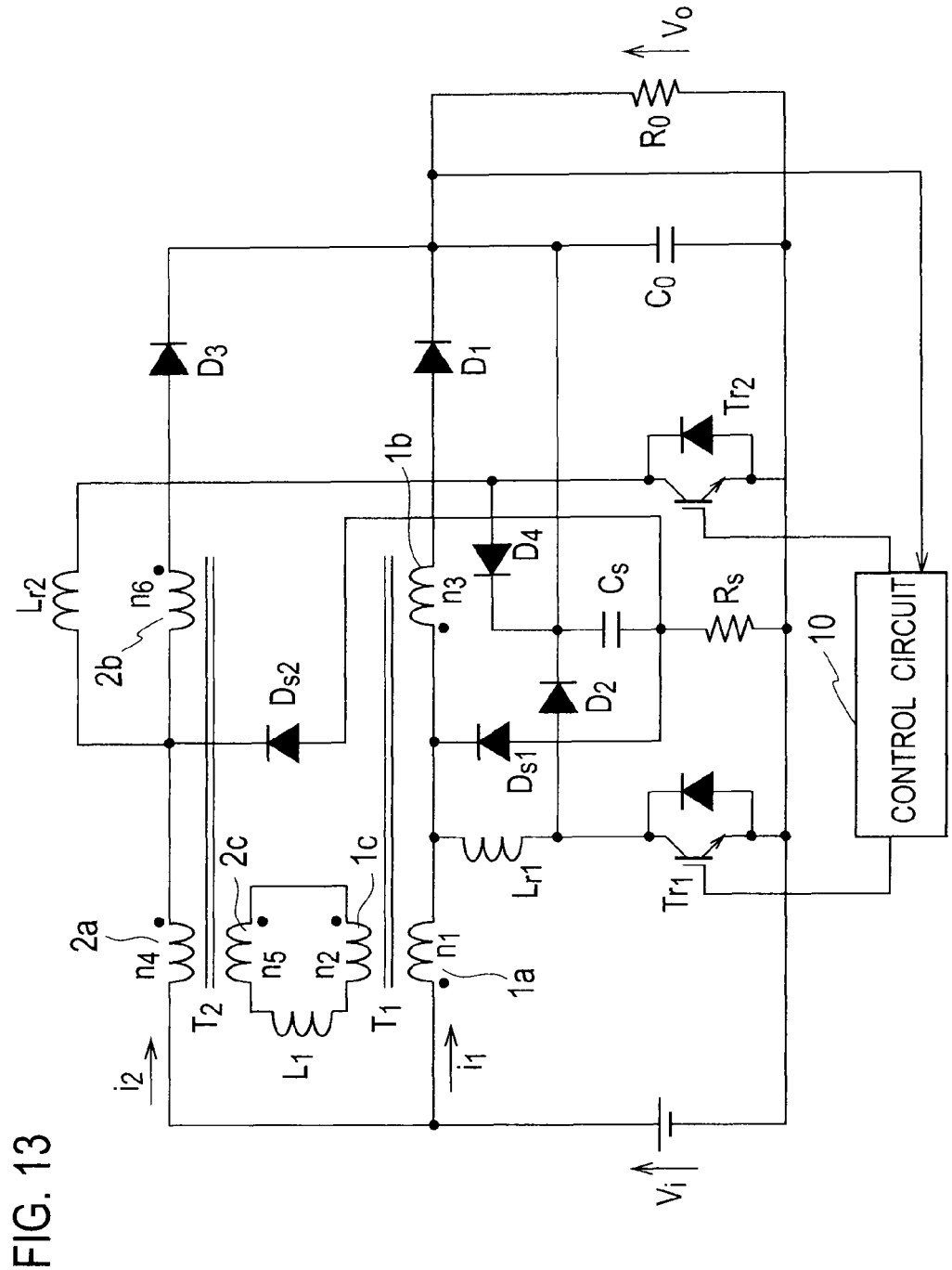
FIG. 13 is a circuit configuration diagram showing a DC-DC converter with a snubber circuit of Example 2.

FIG. 13 is a circuit configuration diagram showing a DC-DC converter with the snubber circuit of Example 2. In Example 1, the reactor Lr1 is connected to the additional winding 1b in series, and the reactor Lr2 is connected to the additional winding 2b in series. In contrast, Example 2 is characterized in that the reactor Lr1 is connected to the switch Tr1 in series, and the reactor Lr2 is connected to the switch Tr2 in series.

The configuration of the snubber circuit constituted of the snubber capacitor Cs, the snubber resistor Rs and the snubber diodes Ds1 and Ds2 is the same as the configuration in Example 1 shown in FIG. 2, and thus description thereof will be omitted.

In the following, described is the operation and effect of the DC-DC converter with the snubber circuit having the reactors Lr1 and Lr2 connected to the respective switches Tr1 and Tr2 in series.

First, the switch Tr1 is turned on by a gate signal of the switch Tr1 from the control circuit 10. Then, an electric current flows through a path from the positive side of Vi to the negative side of Vi through 1a, Lr1, and Tr1. Accordingly, the electric current flowing through the primary winding 1a of the transformer T1 increases. At the same time, a voltage is generated also across the secondary winding 1c of the transformer T1, and an electric current flows through the reactor L1 by flowing through a path from 1c to 1c through 2c and L1.

This electric current flows in accordance with the law of equal ampere-turns of transformers, causing energy to be stored in the reactor L1. At the same time, the same electric current flows through the secondary winding 2c of the transformer T2. Accordingly, across the primary winding 2a of the transformer T2 and across the additional winding 2b thereof, voltages corresponding to the respective numbers of turns are induced.

When an additional winding ratio of the transformer T2 is A=(n4+n6)/n4, an electric current, which is 1/A of the electric current in the switch Tr1, flows through the diode D3 by flowing through a path from the positive side of Vi to the negative side of Vi through 2a, 2b, D3, and Co. The electric current D3i in the diode D3 flows until a time at which the switch Tr2 is turned on. The output voltage Vo across the smoothing capacitor Co is the sum of a voltage across the DC power supply Vi (an input voltage), a voltage generated across the primary winding 2a of the transformer T2, and a voltage generated across the additional winding 2b of the transformer T2.

When a duty factor of the switch Tr1 is D (D=Ton/T), the voltage generated across the transformer T2 is A·Vi·D, where Ton is a period of time during which the switch Tr1 is on, and T is a cycle in which the switch Tr1 is switched. The output voltage Vo across the smoothing capacitor Co is Vo=Vi(1+ A·D). Accordingly, the output voltage Vo can be controlled by changing the duty factor D.

Next, the switch Tr2 is turned off by the gate signal from the control circuit 10. The voltage across the collector and the emitter of the switch Tr2 rises. Then, first, an electric current flows through a path from the positive side of Vi to the negative side of Vi through 2a, Lr2, D4, and Co. Accordingly, an electric current flows through the diode D4.

However, due to the voltage applied across the additional winding 2b of the transformer T2, the electric current in the reactor Lr2 is commutated to the diode D3. Accordingly, the electric current flowing through the diode D3 increases. Along with this, the electric current in the diode D4 decreases gently. Once the electric currents in the primary winding 2a and the additional winding 2b of the transformer T2 finish being commutated to the diode D3, the diode D4 is turned off. Since the diode D4 is turned off along with the gentle decrease of the electric current therein, the occurrence of a recovery loss at the diode D4 is suppressed. Then, after the transformer's electric current is completely commutated to the diode D3, the electric current is in a state where it is passing only through the diode D3 and outputted.

Next, the switch Tr2 is turned on by the gate signal of the switch Tr2 from the control circuit 10. Then, the electric currents in the primary winding 2a and the additional winding 2b of the transformer T2 start being commutated from the diode D3 to the switch Tr2.

At this time, due to the reactor Lr2, the electric current in the switch Tr2 increases gently. Thereby, a zero-current turn on operation can be achieved. Along with this, the electric current in the diode D3 decreases gently as well, hence suppressing the occurrence of a recovery loss at the time of turn off.

The electric current flows through a path from the positive side of Vi to the negative side of Vi through 2a, Lr2, and Tr2. Accordingly, the electric current flowing through the primary winding 2a of the transformer T2 increases. At the same time, a voltage is also generated across the secondary winding 2c of the transformer T2, and an electric current flows through the reactor L1 by flowing through a path from 2c to 2c through L1 and 1c.

This electric current flows in accordance with the law of equal ampere-turns of transformers, causing energy to be stored in the reactor L1. At the same time, the same electric current flows through the secondary winding 1c of the transformer T1. Accordingly, across the primary winding 1a of the transformer T1 and across the additional winding 1b thereof, voltages corresponding to the respective numbers of turns are induced.

When an additional winding ratio of the transformer T1 is A=(n1+n3)/n1, an electric current, which is 1/A of the electric current in the switch Tr2, flows through the diode D1 by flowing through a path from the positive side of Vi to the negative side of Vi through 1a, 1b, D1, and Co. The electric current in the diode D1 flows until a time at which the switch Tr1 is turned on. The output voltage Vo across the smoothing capacitor Co is the sum of a voltage across the DC power supply Vi (an input voltage), a voltage generated across the primary winding 1a of the transformer T1, and a voltage generated across the additional winding 1b of the transformer T1.

When a duty factor of the switch Tr2 is D (D=Ton/T), the voltage generated across the transformer T1 is A·Vi·D, where Ton is a period of time during which the switch Tr2 is on, and T is a cycle in which the switch Tr2 is switched. The output voltage Vo across the smoothing capacitor Co is Vo=Vi(1+A·D). Accordingly, the output voltage Vo can be controlled by changing the duty factor D.

Next, the switch Tr1 is turned off by the gate signal from the control circuit 10. The voltage across the collector and the emitter of the switch Tr1 rises. Then, first, an electric current flows through a path from the positive side of Vi to the negative side of Vi through 1a, Lr1, D2, and Co. Accordingly, an electric current flows through the diode D2.

However, due to the voltage applied across the additional winding 1b of the transformer T1, the electric current in the reactor Lr1 is commutated to the diode D1. Accordingly, the electric current flowing through the diode D1 increases. Along with this, the electric current in the diode D2 decreases gently. Once the electric currents in the primary winding 1a and the additional winding 1b of the transformer T1 finish being commutated to the diode D1, the diode D2 is turned off. Since the diode D2 is turned off along with the gentle decrease of the electric current therein, the occurrence of a recovery loss at the diode D2 is suppressed. Then, after the transformer's electric current is completely commutated to the diode D1, the electric current is in a state where it is passing only through the diode D1 and outputted.

Next, when the switch Tr1 is turned on, the electric currents in the primary winding 1a and the additional winding 1b of the transformer T1 start being commutated from the diode D1 to the switch Tr1.

At this time, due to the reactor Lr1, the electric current in the switch Tr1 increases gently. Thereby, a zero-current turn on operation can be achieved. Along with this, the electric current in the diode D1 decreases gently as well, hence suppressing the occurrence of a recovery loss at the time of turn off.

Meanwhile, like Example 1, the snubber circuit constituted of the snubber capacitor Cs, the snubber resistor Rs, the snubber diode Ds1 and the snubber diode Ds2 is provided in Example 2. Thus, the operation in Example 2 is performed substantially similarly to the operation shown in FIGS. 6(a) to 6(d) in Example 1. As a result, Example 2 can achieve advantageous effects similar to the advantageous effects of Example 1.

That is, it is possible to reduce a surge voltage and suppress noise generation to thereby prevent elements such as the switches from being broken. Moreover, since the voltage across the snubber capacitor Cs is clamped at the output voltage, no further discharge is performed. Accordingly, there is no power loss, which would otherwise occur along with unnecessary charge and discharge of the snubber capacitor Cs. The power loss occurring in this clamp-type snubber circuit is not associated with the snubber capacitor Cs. Moreover, there is no time required for charge and discharge. Hence, high-speed operation is possible.

Industrial Applicability

The present invention is applicable to electric vehicles.

Explanation Of Reference Numerals

Vi DC power supply
Co smoothing capacitor
T1, T2 transformer
Tr1, Tr2 switch
D1 to D4 diode
Ds1, Ds2 snubber diode
Ro load resistor
Cs snubber capacitor
Rs snubber resistor
L1, Lr1, Lr2 reactor
1a, 2a primary winding
1b, 2b additional winding
1c, 2c secondary winding
10 control circuit

The invention claimed is:

1. A DC-DC converter with a snubber circuit, which boosts a voltage of a DC power supply, comprising:
   a first switch connected to both ends of the DC power supply through a primary winding of a first transformer;
   a second switch connected to both ends of the DC power supply through a primary winding of a second transformer;
   a first series circuit connected to both ends of the first switch and including a first reactor, an additional winding of the first transformer, a first diode, and a smoothing capacitor;
   a second diode connected to one end of the first switch and one end of the smoothing capacitor;
   a second series circuit connected to both ends of the second switch and including a second reactor, an additional winding of the second transformer, a third diode, and the smoothing capacitor;
   a fourth diode connected to one end of the second switch and the one end of the smoothing capacitor;
   a third reactor connected to both ends of a series circuit in which a secondary winding of the first transformer and a secondary winding of the second transformer are connected in series;
   a third series circuit connected to both ends of the smoothing capacitor and including a snubber capacitor and a snubber resistor;
   a first snubber diode connected to a node at which the snubber capacitor and the snubber resistor are connected, and to a node at which the first reactor and the additional winding of the first transformer are connected;
   a second snubber diode connected to the node at which the snubber capacitor and the snubber resistor are connected, and to a node at which the second reactor and the additional winding of the second transformer are connected; and
   a control circuit turning on the first switch and the second switch alternately in every ½ cycle, turning off the first switch during an on period of the second switch and turning off the second switch during an on period of the first switch.

2. A DC-DC converter with a snubber circuit, which boosts a voltage of a DC power supply, comprising:
   a first switch connected to both ends of the DC power supply through a primary winding of a first transformer and a first reactor;
   a second switch connected to both ends of the DC power supply through a primary winding of a second transformer and a second reactor;
   a first series circuit connected to both ends of a series circuit which includes the first reactor and the first switch, and including an additional winding of the first transformer which is connected to the primary winding of the first transformer in series, a first diode and a smoothing capacitor;
   a second diode connected to a node at which the first reactor and the first switch are connected, and to one end of the smoothing capacitor;
   a second series circuit connected to both ends of a series circuit which includes the second reactor and the second switch, and including an additional winding of the second transformer which is connected to the primary winding of the second transformer in series, a third diode and the smoothing capacitor;
   a fourth diode connected to a node at which the second reactor and the second switch are connected, and to the one end of the smoothing capacitor;
   a third reactor connected to both ends of a series circuit in which a secondary winding of the first transformer and a secondary winding of the second transformer are connected in series;
   a third series circuit connected to both ends of the smoothing capacitor and including a snubber capacitor and a snubber resistor;
   a first snubber diode connected to a node at which the snubber capacitor and the snubber resistor are connected, and to a node at which the primary winding and the additional winding of the first transformer are connected;
   a second snubber diode connected to the node at which the snubber capacitor and the snubber resistor are connected, and to a node at which the primary winding and the additional winding of the second transformer are connected; and
   a control circuit turning on the first switch and the second switch alternately in every ½ cycle, and turning off the first switch during an on period of the second switch and turning off the second switch during an on period of the first switch.

* * * * *